United States Patent
Subramaniam et al.

(10) Patent No.: US 11,320,995 B2
(45) Date of Patent: May 3, 2022

(54) TRANSFERRING COMPUTATIONAL OPERATIONS TO CONTROLLERS OF DATA STORAGE DEVICES

(71) Applicant: Western Digital Technologies, Inc., San Jose, CA (US)

(72) Inventors: Eswaran Subramaniam, Bangalore (IN); Sathyanarayanan Subramanian, Bangalore (IN); Jatin Gaur, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 127 days.

(21) Appl. No.: 16/177,102

(22) Filed: Oct. 31, 2018

(65) Prior Publication Data
US 2020/0133531 A1   Apr. 30, 2020

(51) Int. Cl.
*G06F 3/06* (2006.01)
*G06F 17/10* (2006.01)
*G06F 1/32* (2019.01)
*G06F 1/3234* (2019.01)
*G06F 16/2455* (2019.01)

(52) U.S. Cl.
CPC .......... *G06F 3/0631* (2013.01); *G06F 1/3268* (2013.01); *G06F 3/0604* (2013.01); *G06F 3/0625* (2013.01); *G06F 3/0679* (2013.01); *G06F 16/24553* (2019.01)

(58) Field of Classification Search
None
See application file for complete search history.

(56) References Cited

U.S. PATENT DOCUMENTS

| | | | | |
|---|---|---|---|---|
| 8,862,862 | B2* | 10/2014 | Zimmer | G06F 9/4401 709/202 |
| 2009/0234983 | A1* | 9/2009 | Golden | G06F 3/14 710/30 |
| 2013/0219175 | A1* | 8/2013 | Gearhart | H04L 63/0428 713/160 |
| 2015/0032938 | A1 | 1/2015 | Salessi | |
| 2015/0154111 | A1 | 6/2015 | D'Abreu et al. | |

(Continued)

OTHER PUBLICATIONS

Bae, D., et al., "Intelligent SSD: A turbo for big data mining," Proceedings of the 22nd ACM international conference on Information & Knowledge Management (CIKM '13), Oct. 2013, ACM, pp. 375-394.

(Continued)

*Primary Examiner* — Fahmida Rahman
(74) *Attorney, Agent, or Firm* — Ravi Mohan; Rutan & Tucker, LLP (57) ABSTRACT

Systems and methods for offloading computational operations. In some implementations a method includes determining whether a data storage device coupled to a computing device is capable of performing a set of computational operations. The data storage device may be hot swappable. The method also includes offloading the set of computational operations to the data storage device in response to determining that the data storage device is capable of performing the set of computational operations. The method further includes performing the set of computational operations on the computing device in response to determining the data storage device is not capable of performing the set of computational operations.

18 Claims, 6 Drawing Sheets

(56) References Cited

U.S. PATENT DOCUMENTS

| | | | | |
|---|---|---|---|---|
| 2017/0154005 | A1* | 6/2017 | Ahmed | G06F 13/4081 |
| 2017/0344490 | A1* | 11/2017 | Blagodurov | G06F 12/1027 |
| 2017/0371829 | A1* | 12/2017 | Chen | G06F 13/4282 |
| 2018/0039519 | A1* | 2/2018 | Kumar | G06F 9/4812 |
| 2018/0052766 | A1 | 2/2018 | Mehra et al. | |
| 2018/0121121 | A1 | 5/2018 | Mehra et al. | |
| 2019/0042483 | A1* | 2/2019 | Abramson | G06F 9/5044 |
| 2019/0096813 | A1* | 3/2019 | Lesea | H01L 23/5386 |
| 2019/0121673 | A1* | 4/2019 | Gold | G06F 3/0608 |
| 2019/0392297 | A1* | 12/2019 | Lau | G06N 3/04 |

OTHER PUBLICATIONS

Boboila, S., et al., "Active Flash: Out-of-core data analytics on flash storage," 2012 IEEE 28th Symposium on Mass Storage Systems and Technologies (MSST), San Diego, CA, 2012, 12 pages.

Cho, B.Y., et al., "XSD: Accelerating MapReduce by Harnessing the GPU inside an SSD," WoNDP: 1st Workshop on Near-Data Processing in Conjunction with the 46th IEEE/ACM International Symposium on Microarchitecture (MICRO-46), Dec. 2013, 6 pages.

Cho, S., et al., "Active Disk Meets Flash: A Case for Intelligent SSDs," Proceedings of the 27th international ACM conference on International conference on supercomputing (ICS '13), ACM, Nov. 2011, 20 pages.

De, A., "Minerva: Accelerating Data Analysis in Next-Generation SSDs," Proceedings of the 2013 IEEE 21st Annual International Symposium on Field-Programmable Custom Computing Machines (FCCM '13). IEEE Computer Society, Apr. 2013, 8 pages.

Jun, S., "BlueDBM: An Appliance for Big Data Analytics," Proceedings of the 42nd Annual International Symposium on Computer Architecture (ISCA '15), ACM, Jun. 2015, 13 pages.

Jo, Y., et al., "Collaborative Processing of Data-Intensive Algorithms with CPU, intelligent SSD, and GPU," Proceedings of the 31st Annual ACM Symposium on Applied Computing (SAC '16), ACM, Apr. 2016, pp. 1865-1870.

Kang, Y., et al., "Enabling Cost-effective Data Processing with Smart SSD," 2013 IEEE 29th Symposium on Mass Storage Systems and Technologies (MSST), May 2013, 12 pages.

Yavits, L., "PRINS: Resistive CAM Processing in Storage," May 2018, 12 pages.

Intel® Movidius Neural Compute Stick, 2018, 5 pages, https://software.intel.com/en-us/neural-compute-stick.

* cited by examiner

TRANSFERRING COMPUTATIONAL OPERATIONS TO CONTROLLERS OF DATA STORAGE DEVICES

BACKGROUND

Field of the Disclosure

This disclosure relates to data storage devices. More particularly, the disclosure relates to transferring and/or offloading computational operations to a data storage device.

Description of the Related Art

Data storage devices may be used to store data used by computing devices. The computing devices may execute applications, apps, services, processes, threads, etc., that may read, write, update, and/or access data that is stored on the data storage devices. For example, the computing devices may perform computational operations using the data stored on the data storage devices.

SUMMARY

In some implementations, an apparatus is provided. The apparatus includes a processing device configured to receive, from a computing device by a data storage device, a request to perform a set of computational operations. The data storage device may be hot swappable. The computing device is processing device is configured to perform the set of computational operations. The set of computational operations is offloaded to the data storage device by the computing device. The set of computational operations includes one or more tensor operations. The processing device is further configured to transmit a set of results of the set of computational operations to the computing device.

In some implementations, a method is provided. The method includes determining whether a data storage device coupled to a computing device is capable of performing a set of computational operations. The data storage device may be hot swappable. The method also includes offloading the set of computational operations to the data storage device in response to determining that the data storage device is capable of performing the set of computational operations. The method further includes performing the set of computational operations on the computing device in response to determining the data storage device is not capable of performing the set of computational operations.

In some implementations, an apparatus is provided. The apparatus includes a processing device configured to determine whether a data storage device coupled to a computing device is capable of performing a set of computational operations. The data storage device is hot swappable. The processing device is also configured to offload the set of computational operations to the data storage device in response to determining that the data storage device is capable of performing the set of computational operations. The processing device is further configured to perform the set of computational operations on the computing device in response to determining the data storage device is not capable of performing the set of computational operations.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following disclosure, reference is made to examples, implementations, and/or embodiments of the disclosure. However, it should be understood that the disclosure is not limited to specific described examples, implementations, and/or embodiments. Any combination of the features, functions, operations, components, modules, etc., disclosed herein, whether related to different embodiments or not, may be used to implement and practice the disclosure. Furthermore, although embodiments of the disclosure may provide advantages and/or benefits over other possible solutions, whether or not a particular advantage and/or benefit is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

The headings provided herein are for convenience only and do not necessarily affect the scope or meaning of the claimed invention. Disclosed herein are example implementations, configurations, and/or embodiments relating to offloading computational operations to a data storage device.

Data storage devices, such as memory cards (e.g., secure digital (SD) cards), memory sticks (e.g., universal serial bus (USB) stick, thumb drives, etc.), solid state drives (SSDs), hard disk drives (HDDs), hybrid drives (e.g., storage drives/devices that include both magnetic media/medium and flash memory), etc., typically include one or more controllers coupled with one or more non-volatile memory (NVM) arrays. The controllers may execute commands (e.g., access commands, data access commands, etc.) to read, write, access, etc., data that may be stored in the one or more NVM arrays.

As discussed above, data storage devices may be used to store data used by computing devices. The computing devices may execute applications, apps, services, processes, threads, etc., that may read, write, update, and/or access data that is stored on the data storage devices. For example, the computing devices may perform computational operations using the data stored on the data storage devices.

Figure 1:
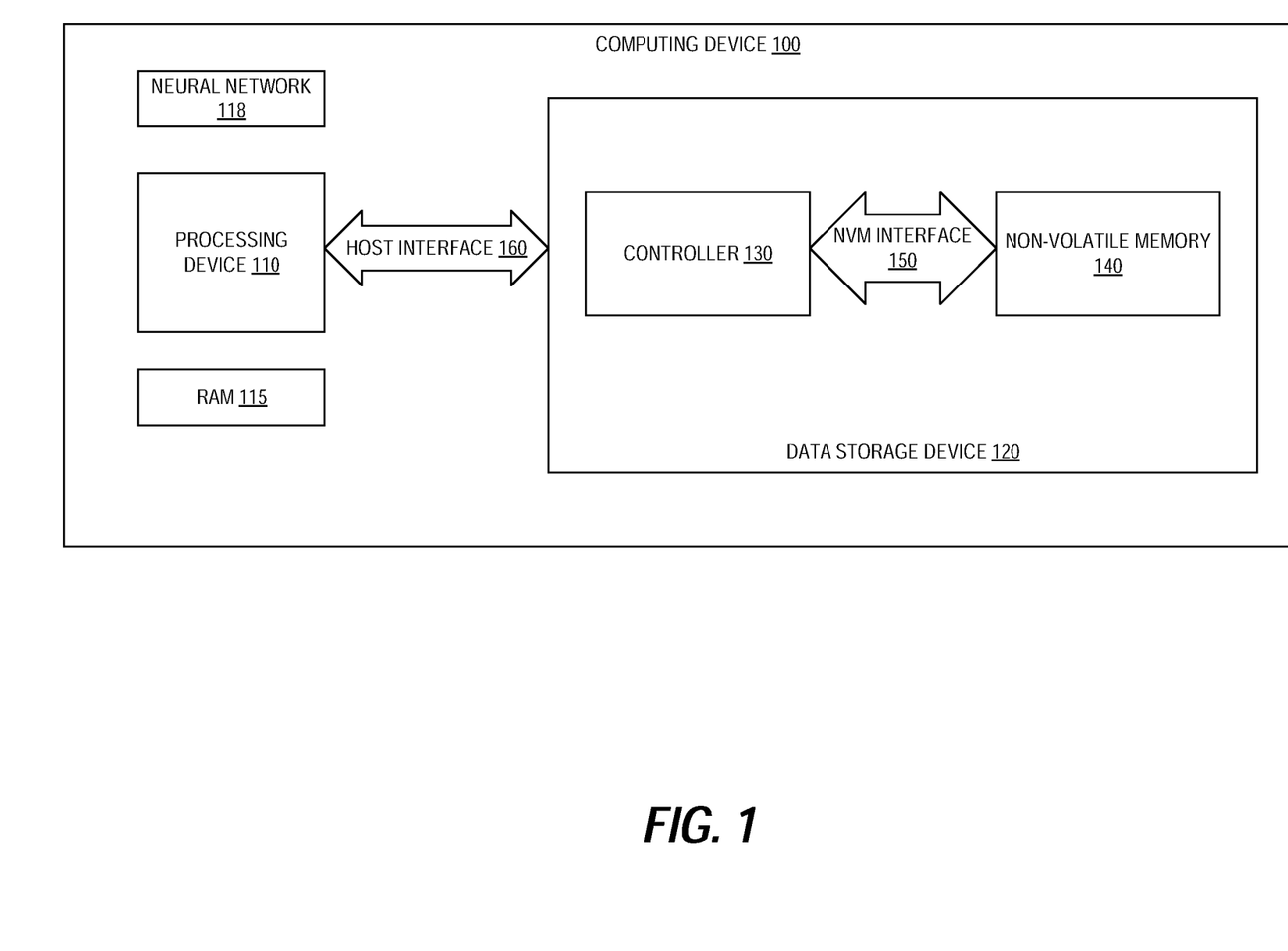
FIG. 1 is a block diagram illustrating an example computing device, in accordance with one or more embodiments of the present disclosure.

FIG. 1 is a diagram illustrating an example computing device 100, in accordance with some embodiments of the present disclosure. The computing device 100 includes a processing device 110, a random access memory (RAM) 115, and data storage device 120. The processing device 110 may be one or more devices that execute instructions (e.g., executes machine instructions, code, machine code, etc.). Examples of a processing device may include, but are not limited to a controller, a system-on-a-chip (SoC), a field-programmable gate array (FPGA), an application-specific integrated circuit (ASIC), a central processing unit (CPU), a processor, a multi-core processor, a graphics processing unit (GPU), etc. The RAM 115 may be a volatile memory that stores data that may be used by the processing device 110 and/or the neural network 118. A volatile memory may be a memory (or other device that stores data and allows access to the data) that does not retain the data when power is not provided to the volatile memory (e.g., when power is turned off).

The computing device 100 may be a device that may execute services, processes, applications, apps, instructions, etc., to perform one or more operations. Examples of computing devices include, but are not limited to, phones (e.g., smart phones, cellular phones, etc.), cable set-top boxes, smart televisions (TVs), video game consoles, laptop computers, tablet computers, desktop computers, server computers, personal digital assistances, wearable devices (e.g., smart watches), media players, cameras, and/or other types of electronic devices. The computing device may also be referred to as a host system. The computing device 100 may be coupled to one or more networks and/or other computing devices via the one or more networks. A network (not illustrated in the figures) may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof.

The data storage device 120 is illustrated as part of the computing device 100 (e.g., may be located inside of a housing, chassis, case, slot, etc., of the computing device 100) in FIG. 1. In other embodiments, the data storage device 120 may be separate from the computing device 100 (e.g., may be an external device that is coupled to the computing device 100 via a cable or port, such as a universal serial bus (USB) cable or port). In one embodiment, the data storage device 120 may be a hot swappable device. A hot swappable device may be a device that can be removed from the computing device 100 or added to the computing device 100 while the computing device remains in operation. In another embodiment, the data storage device 120 may lack a power source (e.g., lack an internal power source, such as a battery). The data storage device 120 may receive power to operate the data storage device 120 from the computing device 100.

The data storage device 120 may incorporate access command scheduling and/or execution in accordance with embodiments, examples, and/or implementations disclosed herein. The data storage device 120 may be any type of data storage device, drive, module, component, system, or the like. Furthermore, the terms "card," "memory card," "drive," "flash drive," "memory stick," "storage drive," "hard drive" and "data storage drive" may be used herein in certain contexts to refer to any type of data storage device, and may be used substantially interchangeably with the term "data storage device" herein in connection with various embodiments and/or in various contexts. As shown, the data storage device 120 (e.g., hybrid hard drive, solid-state drive, a memory card, any storage device utilizing solid-state memory, a hard disk drive, any storage device utilizing magnetic media/medium, etc.) includes a controller 130 (e.g., control circuitry, software, firmware, or a combination thereof) and a non-volatile memory 140. For example, the data storage device 120 may be a secure digital (SD) card, a miniSD card, a microSD card, a compact flash (CF) card, a multimedia card (MMC), an eXtreme digital (xD) card, etc.

The non-volatile memory (NVM) 140 may be configured for long-term storage of data and may retain data between power on/off cycles of the data storage device 120. The non-volatile memory 140 and/or portions of the non-volatile memory 140 may also be referred to as a storage medium. In some embodiments, the non-volatile memory 140 may include solid-state memory. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, triple level cell memory, X4 cell memory, etc.), NOR memory, EEPROM, Ferroelectric Memory (FeRAM), magnetoresistive RAM (MRAM), or other discrete solid-state memory chips.

In other embodiments, the non-volatile memory 140 may include magnetic media (including shingle magnetic recording), optical disks, floppy disks, electrically programmable read only memories (EPROM), electrically erasable programmable read only memories (EEPROM), etc. Non-volatile memory that uses magnetic media/medium may include one or more magnetic platters. Each platter may contain one or more regions of one or more tracks of data. The non-volatile memory 140 may include any combination of the one or more types of memories described here. The non-volatile memory 140 may be divided logically and/or physically into arrays, planes, blocks, pages, tracks, and sectors.

The controller 130 may include one or more processors, memory devices, data and/or power transmission channels/paths, boards, or the like. In some embodiments, the controller 130 may be implemented as one or more system-on-a-chip (SoC) modules, field-programmable gate array (FPGA) modules, application-specific integrated circuit (ASIC) modules, processing devices (e.g., processors), chips, or the like. In other embodiments, one or more components of the controller 130 may be mounted on a printed circuit board (PCB). The controller 130 may be configured to receive data commands from a storage interface (e.g., a device driver) residing on the computing device 100.

The controller 130 may communicate with the computing device 100 over a host interface 160, and may receive commands via the host interface 160. These commands may be referred to as data commands, data access commands, data storage access commands, etc. Data commands may specify a block address in the data storage device 120. Data may be accessed/transferred based on such data commands. For example, the controller 130 may receive data commands (from the computing device 100) and may execute such commands on/in the non-volatile memory 140 (e.g., in one or more arrays, pages, blocks, sectors, etc.). The data commands received from computing device 100 may include read data commands, write data commands, and erase data commands. The controller 130 may be coupled to the non-volatile memory (NVM) 140 via a NVM interface 150. In one embodiment, the NVM interface 150 may include a plurality of channels (e.g., one or more lines, pines, wires, traces, etc.) and each channel may be coupled to different portions of the non-volatile memory 140 (e.g., different NVM arrays, different flash arrays, etc.).

The controller 130 may execute the received data commands to read, write, and erase data from non-volatile memory 140, via the NVM interface 150. For example, the commands may include a read command (e.g. a data read command) to read a block of data from the non-volatile memory 140. The controller 130 may read the data from the page and may transmit the data to the computing device 100 via the host interface 160. In another example, the commands may include a write command (e.g., a data write command) to write data to a page in a non-volatile memory 140. In one embodiment, write commands may include program commands (e.g., a command to write the value "1" to a location the non-volatile memory 140) and erase commands (e.g., a command to write the value "0" to a location, a page, a block, etc., in the non-volatile memory array). The controller 130 may receive the data from the computing device 100 via the host interface 160 and may write the data to the page.

The controller 130 may include an encoder (not illustrated in the figures). The encoder 131 may encode data when storing the data on the non-volatile memory 140. The encoder may encode the data to protect the data from errors, loss, corruption, etc. The encoder may protect the data from errors, loss, corruption, etc., using various methods, techniques, functions, operations, actions, etc. For example, the encoder may protect the data by generating parity data (e.g., parity bits). The parity bits may allow the controller 130 to determine whether there are errors in the data (e.g., errors due to corruption, damaged cells, damaged blocks, error while reading the data, etc.). The parity bits may also allow the controller 130 to correct or recover from errors in the data.

In some embodiments, the encoder encodes stored data using error correction codes (ECCs). An error correction code may include algorithms, methods, techniques, functions, operations, etc., that may encode data into codewords. The codewords (e.g., encoded data) may be decoded even though there may be errors in one or more portions of the codewords. For example, even though one or more bits of the codeword may be incorrect or corrupted (e.g., due to a faulty memory cell), the error correction code can still be used to decode or recover the data encoded in the codeword. One type of error correction code used by the encoder may be may be a low-density parity-check code (LDPC). Another type of binary code used by the encoder 131 may be may be a polar code. The encoder may use the ECCs to generate codewords. A codeword may be a string or series of bits (e.g., a bit string) that is generated based on the data received by the encoder 131 (which is to be stored on the non-volatile memory 140). The codeword may allow the data, which is encoded in the polar code codeword, to be recovered when errors occur.

The controller 130 may also include a decoder (not illustrated in the figures). The decoder may decode data that is stored on the non-volatile memory 140. In some embodiments, decoder decodes stored data (e.g., data encoded into codewords which are stored on the non-volatile memory 140) using ECCs. For example, the decoder 132 may decode codewords which encode the data that is stored on the non-volatile memory 140. The decoder 132 may perform error detection to determine the integrity of data retrieved from non-volatile memory 140 (e.g., to determine the integrity of the data encoded in a codeword). The decoder 132 may also perform error correction of retrieved data. For example, the decoder 132 may use parity data, codewords, etc., to recover the data.

The data storage device 120 may store data received from the computing device 100 such that the data storage device 120 acts as data storage for the computing device 100. To facilitate this function, the controller 130 may implement a logical interface. The logical interface may present to the computing device memory as a set of logical addresses (e.g., sequential/contiguous addresses) where data may be stored. Internally, the controller 130 may map logical addresses to various physical memory addresses in the non-volatile memory arrays 141 and/or other memory module(s). Mapping data indicating the mapping of logical addresses to physical memory addresses may be maintained in the data storage device. For example, mapping table data may be stored in non-volatile memory 140 in order to allow for recreation of mapping tables following a power cycle.

In one embodiment, the processing device 110 may read, write, and/or access data in the non-volatile memory 140. For example, computing device 100 may be a camera (e.g., a video camera, a security camera) and the data storage device 120 may be a memory card (e.g., a SD card) that is coupled to the processing device 110 (e.g., that is inserted into a slot in the computing device 100). As the computing device 100 captures (e.g., records, takes, etc.) images and/or video, the computing device 100 may store the images and/or video on the data storage device 120. For example, the computing device 100 may provide the images and/or video to the data storage device 120 and the controller 130 may write the images and/or video to the non-volatile memory 140.

In some embodiments, the processing device 110 may execute applications, apps, processes, services, etc., that may use the data that is stored in the non-volatile memory 140. For example, the computing device 100 may be a camera (e.g., a web camera, a security camera, a video camera, etc.). The processing device 110 may execute a neural network 118 (or another appropriate machine learning application). The neural network 118 may analyze the images and/or video captured by the camera. For example, the neural network 118 may analyze the images and/or video to determine if an object, person, event, etc., was detected by the camera. In another example, the computing device may be a sensor (e.g., smart thermostat, a temperature sensor, a humidity sensor, an environmental sensor, etc.). The processing device 110 may execute a neural network 118 to analyze previous temperatures, and determine how to operate a heating or cooling unit (e.g., an air conditioner).

In some embodiments, the neural network 118 may be a collection of connected and/or interconnected nodes. The nodes may also be referred to as neurons. Each node may transmit a signal, messages, data, information, etc., to one or more other nodes. A node may receive a signal, message, data, information, etc., from another node and may generate additional signals, messages, data, information, etc., to transmit to other nodes that are connected to it. The neural network 118 may be a computing model that may be used to determine a feature in input data through various computations. The neural network 118 may determine a feature (e.g., a number, shape, pattern, etc.) in input data (e.g., audio data, image data, video data, etc.) according to a structure that defines a sequence of computations to be performed, and weight values that define coefficients applied to the computations. The neural network 118 may also include weights or weight values. The weights or weight values may be scaling factors between two or more nodes. For example, the structure may be represented as connections of different nodes, where each node represents a summation of its inputs, and a weight value associated with a connection may represent a coefficient or a scaling factor multiplied to an output of a node in that connection.

One type of neural network may be a convolutional neural network (CNN). A CNN may be a feed forward neural network. A feed forward neural network may be a type of neural network where the connections between the nodes do not form a cycle. Another type of neural network may be a recurrent neural network (RNN). A RNN may be a neural network where the connections between nodes may form a directed graph. A RNN may be a type of neural network where the connections between the nodes may form a cycle.

As discussed above, the processing device 110 may execute applications, apps, processes, services, etc., that may use the data that is stored in the non-volatile memory. The processing device 110 may perform various operations on or using the data stored in the non-volatile memory 140. For example, the processing device 110 may execute the neural network 118 and the neural network 118 may access, analyze, process, etc., data that is stored in the data storage device 120. For example, the neural network 118 may perform tensor operations on the images and/or video that is stored in the data storage device 120 (e.g., stored in the non-volatile memory 140). When the neural network 118 analyzes the data stored on the non-volatile memory 140 (e.g., image data and/or video data), the data may be retrieved from the non-volatile memory 140 and stored in the RAM 115. The processing device 110 and/or the neural network 118 may perform one or more operations to process, analyze, etc., the data. For example, the processing device 110 and/or neural network 118 may perform tensor operations (e.g., a tensor addition operation, a tensor subtraction operation, a tensor multiplication operation, etc.) on the tensors (e.g., data) that is retrieved from the non-volatile memory and stored in the RAM 115. Tensors and tensor operations are discussed in more detail below.

After performing the one or more operations (e.g., after analyzing the data, after generating/calculating additional data based on the data, etc.) the processing device 110 and/or the neural network 118 may store one or more results to the data storage device 120. For example, the processing device 110 and/or the neural network 118 may generate, calculate, determine, obtain, etc., one or more results (e.g., one or more values or other data) and may store the one or more results in the non-volatile memory 140. The one or more results may include updates or modifications to the data that was retrieved from the non-volatile memory 140 and/or may include new or additional data that was generated, determined, calculated, etc., based on the data that was retrieved from the non-volatile memory 140.

However, it may take time retrieve the data from the non-volatile memory 140 and store the data in the RAM 115 so that the processing device 110 and the neural network 118 may use the data. For example, it takes time for the controller 130 to retrieve the data from the non-volatile memory 140 (via the NVM interface 150) and provide the data to the processing device 110 (via the host interface 160). This time (to retrieve the data from the non-volatile memory 140 and store the data in the RAM 115) may increase the latency for performing one or more operations on the data. In addition, after the one or more operations are performed, the results of the one or more operations (e.g., the modified data or new/additional data) may be stored in the non-volatile memory 140 for further or later operations to use. For example, after performing a tensor add operation, the resulting tensor (e.g., the sum of two tensors) may be stored in the non-volatile memory 140. Storing one or more results of the one or more operations (that may be performed by the processing device 110 and/or the neural network 118) may also take additional time which increases the latency or delay when performing operations on the data. In addition, it may take time and/or resources for the processing device 110 to process and/or analyze the data. For example, the processing device 110 may use one or more processing cores, computation engines, arithmetic units, threads, etc., to analyze and/or process the data. The processing device 110 may also use portions of the RAM 115 to store the data that is being analyzed and/or processed.

The computing device 100 may reduce the time and/or resources, used by the processing device 110, by transmitting the data to another computing device. However, the delay to retrieve the data from the data storage device 120 is still present even if the computing device 100 transmits the data to another computing device. In addition, while transmitting the data to another computing device may reduce the time and/or resources (e.g., processing power, processing resources, etc.) used by the processing device 110, this may increase the network bandwidth used by the computing device 100.

Thus, it may be useful to decrease the amount of time it takes for the processing device 110 and/or the neural network 118 to perform operations on the data stored in the data storage device 120. It may also be useful to allow the processing device 110 and/or the neural network 118 to perform the operations without increasing the network bandwidth used by the computing device 100. It may also be useful to be able to increase the capabilities (e.g., the processing capabilities, the capability to perform operations) of the computing device 100 without upgrading the components of the computing device 100 (e.g., without using a faster processing device, without using more RAM 115, etc.).

Figure 2:
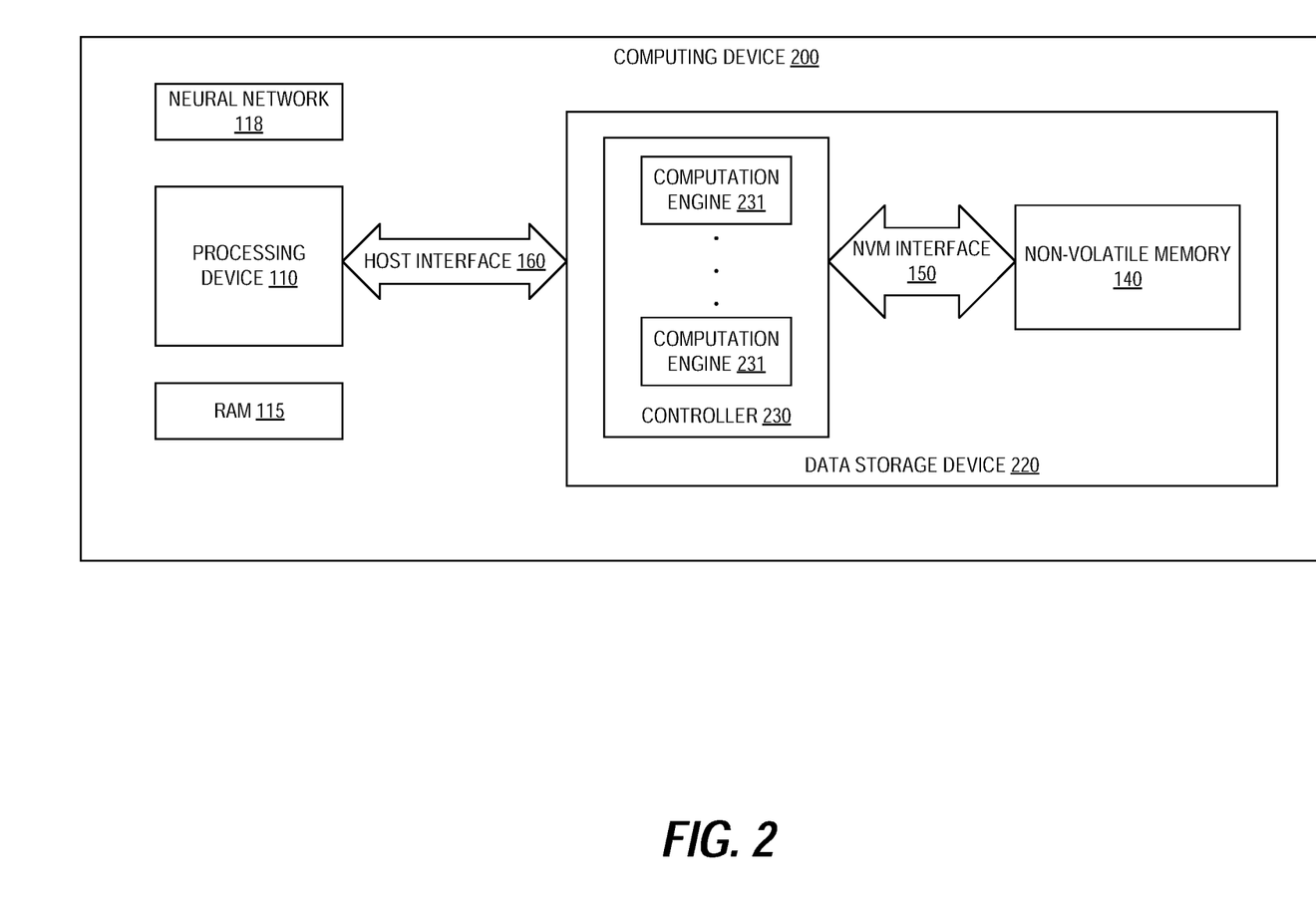
FIG. 2 is a block diagram illustrating an example computing device, in accordance with one or more embodiments of the present disclosure.

FIG. 2 is a diagram illustrating an example computing device 200, in accordance with some embodiments of the present disclosure. The computing device 200 includes a processing device 110, a random access memory (RAM) 115, and data storage device 220, as discussed above. The computing device 200 may be a device that may execute services, processes, applications, apps, instructions, etc., to perform one or more operations. The computing device 200 may be coupled to one or more networks and/or other computing devices via the one or more networks. A network (not illustrated in the figures) may include a public network, a private network, a wide area network, a wired network, a wireless network, a cellular network, routers, hubs, switches, server computers, other types of computer networks, and/or a combination thereof.

The data storage device includes a controller 230 coupled to a non-volatile memory 140 via a NVM interface 150. The controller 230 includes one or more computation engines 231. Although the computation engines 231 are illustrated as part of controller 230, the computation engines 231 may be separate from the controller 230 in other embodiments. The computation engines 231 may be hardware, software, firmware, or a combination thereof, that are configured to perform one or more computational operations.

Although the data storage device 220 is illustrated as part of the computing device 100 (e.g., may be located inside of a housing, chassis, case, slot, etc., of the computing device 100), in other embodiments, the data storage device 220 may be separate from the computing device 100 (e.g., may be an external device that is coupled to the computing device 100 via a cable, such as a universal serial bus (USB) cable).

The data storage device 220 may incorporate access command scheduling and/or execution in accordance with embodiments, examples, and/or implementations disclosed herein. The data storage device 220 may be any type of data storage device, drive, module, component, system, or the like, that is configured to read data, write data, store data, and/or allow access to the data. As shown, the data storage device 220 includes a controller 230 (e.g., control circuitry, software, firmware, or a combination thereof) and a non-volatile memory 140. For example, the data storage device 220 may be a secure digital (SD) card, a miniSD card, a microSD card, a compact flash (CF) card, a multimedia card (MMC), an eXtreme digital (xD) card, a thumb drive, a USB drive, a stick drive, a USB stick, etc.

The non-volatile memory (NVM) 140 may be configured for long-term storage of data and may retain data between power on/off cycles of the data storage device 220. The non-volatile memory 140 and/or portions of the non-volatile memory 140 may also be referred to as a storage medium. In some embodiments, the non-volatile memory 140 may include solid-state memory. In other embodiments, the non-volatile memory 140 may include magnetic media, optical disks, floppy disks, electrically programmable read only memories (EPROM), electrically erasable programmable read only memories (EEPROM), etc. The non-volatile memory 140 may include any combination of the one or more types of memories described herein. The non-volatile memory 140 may be divided logically and/or physically into arrays, planes, blocks, pages, tracks, and sectors.

The controller 230 may include one or more processors, memory devices, data and/or power transmission channels/paths, boards, or the like. In some embodiments, the controller 230 may be implemented as one or more SoC modules, FPGA modules, ASIC modules, processors, or the like. The controller 230 may be configured to receive data commands from a storage interface (e.g., a device driver) residing on the computing device 100. The controller 230 may communicate with the computing device 100 over a host interface 160, and may receive commands via the host interface 160. These commands may be referred to as data commands, data access commands, data storage access commands, etc. Data may be accessed/transferred based on such data commands. The controller 230 may be coupled to the non-volatile memory (NVM) 140 via a NVM interface 150 that may include a plurality of channels coupled to different portions of the non-volatile memory 140. The controller 230 may execute the received data commands to read, write, and erase data from non-volatile memory 140, via the NVM interface 150. The controller 230 may include an encoder (not illustrated in the figures), as discussed above. The controller 230 may also include a decoder (not illustrated in the figures), as discussed above. The encoder and the decoder may encode and decode codewords, respectively, using ECCs.

The data storage device 220 may store data received from the computing device 100 such that the data storage device 220 acts as data storage for the computing device 100. To facilitate this function, the controller 230 may implement a logical interface. The logical interface may present to the computing device memory as a set of logical addresses where data may be stored. Internally, the controller 230 may map logical addresses to various physical memory addresses in the non-volatile memory 140.

As discussed above, the processing device 110 may execute applications, apps, processes, services, etc., that may use the data that is stored in the non-volatile memory 140. For example, the processing device 110 may execute a neural network 118 (or another appropriate machine learning application) to perform various functions, operations, actions, etc. In some embodiments, the neural network 118 may be a collection of connected and/or interconnected nodes. A node may receive a signal, message, data, information, etc., from another node and may generate additional signals, messages, data, information, etc., to transmit to other nodes that are connected to it. The neural network 118 may be a computing model that may be used to determine a feature in input data through various computations. The neural network 118 may also include weights or weight values that may be scaling factors between two or more nodes. One type of neural network may be a convolutional neural network CNN. Another type of neural network may be RNNs.

The neural network 118 may perform various operations using the data storage in the non-volatile memory 140. As discussed above, retrieving the data from the non-volatile memory and providing it to the processing device 110 may increase the latency or delay for the processing device 110 to perform various computational operations. Thus, it may be useful to perform the computational operations more quickly and/or efficiently.

In one embodiment, the processing device 110 may detect that the data storage device 220 has been coupled to the computing device 200. For example, the processing device 110 may detect, determine, etc., that the data storage device 220 (e.g., a SD card, a memory card, etc.) has been inserted into a card slot of the computing device 200. In another example, the processing device 110 may detect that the data storage device 220 (e.g., a USB stick) has been plugged into a port (e.g., a USB port) of the computing device 200.

In one embodiment, the processing device 110 may request capability data from the data storage device 220. For example, the processing device 110 may transmit a message, packet, etc., via the host interface to the data storage device 220 (e.g., to the controller 230). The data storage device 220 (e.g., the controller 230) may transmit the capability data to the processing device 110 in response to the request. In another embodiment, the data storage device 220 may transmit the capability data to the processing device 110 (via the host interface 160) when the data storage device 220 detects that the data storage device 220 has been coupled to the computing device 100 (e.g., may automatically transmit the capability data when the data storage device 220 is inserted into a slot or plugged into a port).

In some embodiments, the capability data may be data that may indicate the types of operations, functions, calculations, etc., which the controller 230 and/or the one or more computation engines 231 may support. For example, the capability data may include numbers, alphanumeric values, bit strings, flags, etc., that may indicate the types of operations that the data storage device 220 (e.g., the controller 230 and/or the computation engines 231 are capable of performing. For example, the capability data may indicate that a computation engine 231 is able to perform tensor operations. In another example, the capability engine may indicate that a computation engine 231 is able to perform Fast Fourier Transforms (FFTs). In a further example, the capability engine may indicate that a computation engine 231 is able to perform Discrete Cosine Transforms (DCTs). The capability data may also indicate which computation engines 231 are capable of performing which operations. For example, different computation engines 231 may be able to perform different operations (e.g., may perform different computations, may have different capabilities, etc.).

In other embodiments, the capability data may also indicate an amount of resources (e.g., power) that may be used by each of computation engines 231 (e.g., 100 milliamps (mA), 900 mA, etc.). The capability data may also indicate different temperatures for the computation engines 231. For example, the capability data may indicate a first temperature (e.g., an idle temperature) for a computation engine 231, a second temperature (e.g., a load temperature when the computation engine 231 is operating at full speed or load), etc.

In one embodiment, the computing device 200 (e.g., the processing device 210) may determine whether the data storage device 220 (e.g. one or more computation engines 231) is capable of performing one or more computational operations (e.g., a set of computational operations) based on the capability data. For example, the computing device 200 may determine whether one or more computation engines 231 are able to perform tensor operations based on the capability data (e.g., whether the capability data indicates that a computation engine 231 is able to perform tensor operations). If the computing device 200 determines that the data storage device 220 is capable of performing the one or more computational operations, the computing device may offload (e.g., transfer) the one or more computational operations to the data storage device. For example, the computing device 200 may offload the one or more operations from the processing device 110 to one or more computation engines 231. In another example, the computing device may use the computation engines 231 to perform the one or more operations, rather than using the processing device 110. If the computing device 200 determines that the data storage device 220 is not capable of performing the one or more computational operations, the computing device 200 may perform the one or more computational operations. For example, the processing device 110 may perform the one or more computational operations.

In one embodiment, the computing device 200 (e.g., the processing device 110) may offload (e.g., transfer the set of computational operations to the data storage device 220) by establishing a communication channel between the computing device 200 and the data storage device 220. For example, the computing device 200 may setup a communication channel (e.g., a logical communication channel, a physical communication channel that includes one or more pins, wires, traces, etc.) with the data storage device 220 to communicate instructions, information, or other data that may allow the data storage device 220 to perform the one or more operations. The computing device 200 may transmit data indicating one or more parameters (e.g., a set of parameters) for the set of computational operations to the data storage device 220 via the communication channel. Examples of parameters may include, but are not limited to: 1) the names of operations that should be performed by a computation engine 231 (e.g., a tensor add operation, a tensor multiple operation, etc.); 2) one or more locations of data that may be used while performing the one or more operations (e.g., locations of tensors that are stored in the non-volatile memory 140); 3) one or more locations for storing the result of the one or more operations; 4) the size of the data that may be used while performing the one or more operations; and 5) various additional data that may be used (e.g., names of libraries or functions that should be used to perform the one or more operations formats for data, variables, arguments, attributes, etc.).

In one embodiment, the computing device 200 (e.g., the processing device 110) may receive one or more results (e.g., a set of results) of the computational operations from the data storage device 220. For example, the computing device 200 may receive data (e.g., a resulting value, number, vector, table, list, tensor, etc.) that is generated, determined, calculated by the data storage device 220. The one or more results may also include one or more locations where a result of the computational operations is stored. For example, the one or more results may include locations in the non-volatile memory 140 where a result tensor is stored. In some embodiments, the one or more results may be new data that is generated, determined, calculated by the data storage device 220. For example, the one or more results may be a new number or value that is calculated by the data storage device. In other embodiments, the one or more results may be data that has been modified or updated.

In one embodiment, the computing device 200 (e.g., the processing device 110) may perform one or more additional computational operations based on the set of results. For example, the computing device 200 may receive a result tensor that is the sum of a first sensor and a second tensor. The result tensor may be determined, generated, calculated, etc. by one or more of the computation engines 231 by performing a tensor add operation on the first tensor and a second tensor. The computing device 200 may perform additional operation using the result tensor.

In one embodiment, the computing device 200 may determine whether the computing device has sufficient resources to allow the data storage device 220 to perform one or more computational operations. If the computing device 200 has sufficient resources to allow the data storage to perform the one or more computational operations, the computing device 200 may offload, transfer, etc., the one or more computational operations to the data storage device 220 (e.g., to the computation engines 231). If the computing device 200 does not have sufficient resources to allow the data storage to perform the one or more computational operations, the computing device 200 perform the one or more computational operation itself (e.g., may have the processing device 110 perform the one or more computational operations.

In one embodiment, the computing device 200 (e.g., the processing device 110) may determine whether the computing device 200 has sufficient resources by determining whether the computing device 200 is capable of providing enough power to the data storage device 220 to have the computation engines 231 perform the one or more operations. For example, the computing device 200 may use power (received from a power source such as a power supply, a battery, an outlet, etc.) to operate. The power may be used to operate the processing device 110, the RAM 115, the data storage device 220. The computation engines 231 may also use power to perform the one or more operations. As discussed above, the data storage device 220 may not have a power source or power supply and may use the power received by the computing device 200. Thus, the computation engines 231 may use the power received by the computing device 200 to operate (e.g., to perform one or more computational operations). The computing device 200 may determine whether the computing device 200 is able to provide the additional power that may be used by the computation engines 231.

In one embodiment, the computing device 200 (e.g., the processing device 110) may determine whether the computing device 200 has sufficient resources by determining whether one or more thermal constraints may be satisfied if the one or more computational operations are offloaded, transferred, etc., to the data storage device 220. For example, the computing device 200 may determine whether the temperature of one or more of the computation engines 231 may exceed a threshold temperature. If the temperature of one or more of the computation engines 231 may exceed the threshold temperature, the computing device may determine that the one or more computational operations cannot be offloaded to the data storage device 220.

In one embodiment, the data storage device 220 (e.g., the controller 230) may receive a request, query, etc., for capability data that may indicate the types of operations that the data storage device 220 (e.g., the computation engines 231) may be able to perform. The data storage device 220 may transmit the capability data to the processing device 110 in response to the request, query, etc. In another embodiment, the data storage device 220 may transmit the capability date when the data storage device 220 determines that the data storage device 220 is coupled to the computing device (e.g., is inserted into a slot, is inserted into a port, etc.).

As discussed above, the computing device 200 may establish a communication channel with the data storage device when the computing device 200 determines that one or more computational operations can be offloaded or transferred to the data storage device. In one embodiment the data storage device (e.g., the controller 230) may receive a request to offload or transfer the one or more computational operations to the data storage device. The request may include data indicating one or more parameters (e.g., a set of parameters) for the set of computational operations, as discussed above. The data storage device 220 (e.g., the computation engines 231) may perform the one or more computational operations based on the one or more parameters. For example, the one or more parameters may identify locations for two tensors and may indicate that a tensor addition operation should be performed using the two tensors.

In one embodiment, the data storage device 220 may transmit one or more results of the computational operations to the computing device 200 via the communication channel. For example, the computing device 200 may transmit data (e.g., a resulting value, number, vector, table, list, tensor, etc.) that is generated, determined, calculated by one or more of the computation engines 231. The one or more results may also include one or more locations where a result of the computational operations is stored, as discussed above.

As discussed above, it may take time retrieve the data from the non-volatile memory 140 and store the data in the RAM 115 so that the processing device 110 and the neural network 118 may use the data. This may increase the delay or latency for an application, service, process, etc., to perform an operation and/or execute. This delay or latency may be increased if the data that is retrieved from the non-volatile memory 140 is large. For example, tensors (e.g., multi-dimensional vectors or lists) may be large in size. The examples, implementations, and/or embodiments described herein may allow data storage device 220 (e.g., the computation engines 231) to perform computational operations using the data (e.g., one or more tensors) without transferring the data to the processing device 110 and/or the RAM 115. This may allow the computational operations to be performed more quickly and/or more efficiently.

In addition, the examples, implementations, and/or embodiments described herein may allow the computing device 200 to obtain the results of the computational operations without sending/transmitting the data to another computing device (e.g., a server computing device). Because computational operations may be performed by the data storage device 220, the computing device 200 may reduce network bandwidth usage because it may not transmit the data to another computing device. This also decreases the latency or delay in obtaining the results of the computational operations.

Furthermore, the examples, implementations, and/or embodiments described herein may enhance the functionality and/or capabilities of the computing device 200 without updating components of the computing device 200. For example, if the computing device 200 is unable to perform tensor operations or does not have enough computing resources (e.g., processing power, memory, etc.) to spare for the tensor operations, the computing device 200 may be able to use the computation engines of the data storage device 220 to perform the tensor operations. The allows the computing device 200 to perform computational operations that the computing device 200 previously may not have been able to perform, without upgrading, updating, or modifying the components of the computing device 200.

Figure 3:
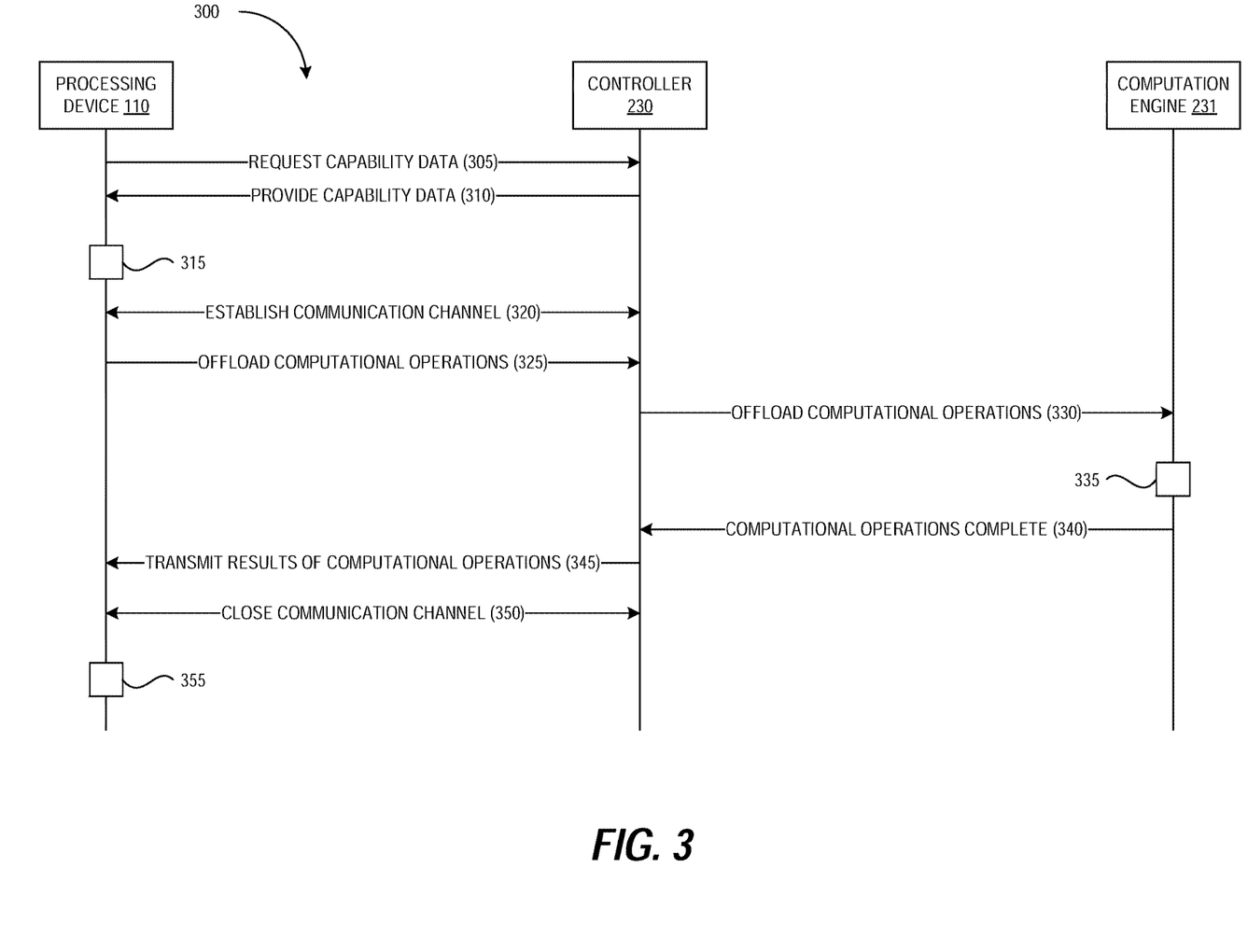
FIG. 3 is a sequence diagram illustrating example actions that may be performed by a processing device, a controller, and a computation engine, in accordance with one or more embodiments of the present disclosure.

FIG. 3 is a sequence diagram 300 illustrating example actions that may be performed by a processing device 110, a controller 230, and a computation engine 231, in accordance with one or more embodiments of the present disclosure. As discussed above, a computing device (e.g., computing device 200 illustrated in FIG. 2) includes the processing device 110. A data storage device may be coupled to the computing device (e.g., inserted into a slot in the computing device, coupled to a port of the computing device, etc.). The data storage device includes a controller 230. The controller 230 may include the computation engine 231 or the computation engine 231 may be separate from the controller 230 (e.g., a separate chip, a separate module, a separate circuit, etc.).

At block 305, the processing device 110 may optionally request capability data from the controller 230. As discussed above, the capability data may indicate the types of operations (e.g., types of computational operations) that the computation engine 231 may perform. The processing device 110 may request the capability data when the processing device 110 detects the data storage device (e.g., detects that the data storage device has been coupled to the computing device). The controller 230 may provide or transmit the capability data to the processing device 110 at block 310.

At block 315, the processing device 110 may determine whether the computation engine 231 is capable of performing one or more computational operations based on the capability data. For example, the processing device 110 may analyze the capability data to determine whether the capability data indicates a desired computational operation. The processing device 110 may also determine whether the computing device has sufficient resources to allow the computation engine 231 to perform the one or more computational operations, as discussed above. The processing device 110 may determine that the computation engine 231 is capable of performing the one or more computational operations and that the computing device has sufficient resources to allow the computation engine 231 to perform the one or more computational operations at block 315.

At block 320, the processing device 110 may establish a communication channel with the controller. The communication channel may allow the processing device 110 and the controller 230 to communicate data (e.g., parameters) that is used to offload (e.g., transfer) one or more computational operations to the computation engine 231. At block 325, the processing device 110 may transmit a request to offload one or more computational operations to the computation engine 231. The request may include parameters for the one or more computational operations (e.g., data that identifies the computations operations to be performed, inputs to the computational operations, formats for the inputs or results, etc.). At block 330, the controller 230 may forward the request and/or the parameters to the computation engine 231.

TABLE 1

| Parameter Name | Description |
| --- | --- |
| Computational Library | May specify the computational libraries that may be used to perform the computational operations. |
| Data Format | May specify the format of input data that is used to perform the computational operations and/or output data (e.g., results). |
| Operation | May specify the operation that should be performed. |
| Data Location | May specify the locations of data (e.g., input data, tensors, etc.) that may be used to perform the computational operations. |
| Data Size | May specify the size (e.g., in megabytes, gigabytes, etc.) of the data that may be used to perform the computational operations. |
| Result Location | May specify the location where the result of the computational operations may be stored. |
| Additional Parameters | May specify any additional parameters, inputs, arguments, variables, attributes, or data that may be used to perform the computational operations. |

Table 1 illustrates example parameters which may be transmitted by the processing device 110 to the controller 230 at block 325, and which may be transmitted by the controller 230 to the computation engine 231 at block 330. As illustrated in table 1, the parameters include: 1) Computational Library; 2) Data Format; 3) Operation; 4) Data location; 5) Data Size; 6) Result Location; and 7) Additional Parameters.

At block 335, the computation engine 231 may perform the one or more computational operations. As discussed above, the one or more computational operations may use data that is stored in a non-volatile memory of the data storage device. Because the computation engine 231 is located in the data storage device, the computation engine 231 may be able to perform the computational operations using the data more quickly and efficiently than if the data were retrieved and provided to the processing device 110. In addition, by offloading the computational operations to the computation engine 231, the processing device 110 may be able to perform other operations in tasks. For example, the processing device 110 may be able to perform other computational operations. This may allow the processing device 110 (and/or a computing device) to operate (e.g., perform functions, perform actions, perform operations, execution applications, execute services, etc.) more quickly and/or more efficiently.

At block 340, the computation engine 231 may transmit data (e.g., a message) to the controller 230 indicating that the one or more computational operations have been completed. For example, the computation engine 231 may transmit a message with a flag set to a value to indicate that the one or more computational operations have been completed. The message may also include one or more results of the computational operations. The one or more results may be resulting data that was generated, calculated, determined, etc., by the computation engine (e.g., may be a resulting tensor) or may be a list of locations where the resulting data is stored and the size of the resulting data (e.g., a memory address where the resulting tensor is stored and a size for the resulting tensor). The controller may transmit the results of the computational operations to the processing device 110 at block 345. The processing device 110 may optionally close the communication channel to the controller 230 at block 350. In other embodiments, the processing device 110 may leave the communication channel open to offload additional computational operations to the computation engine 231. At block 355, the processing device 110 may optionally perform additional computational operations based on the results received from the computation engine 231.

Figure 4:
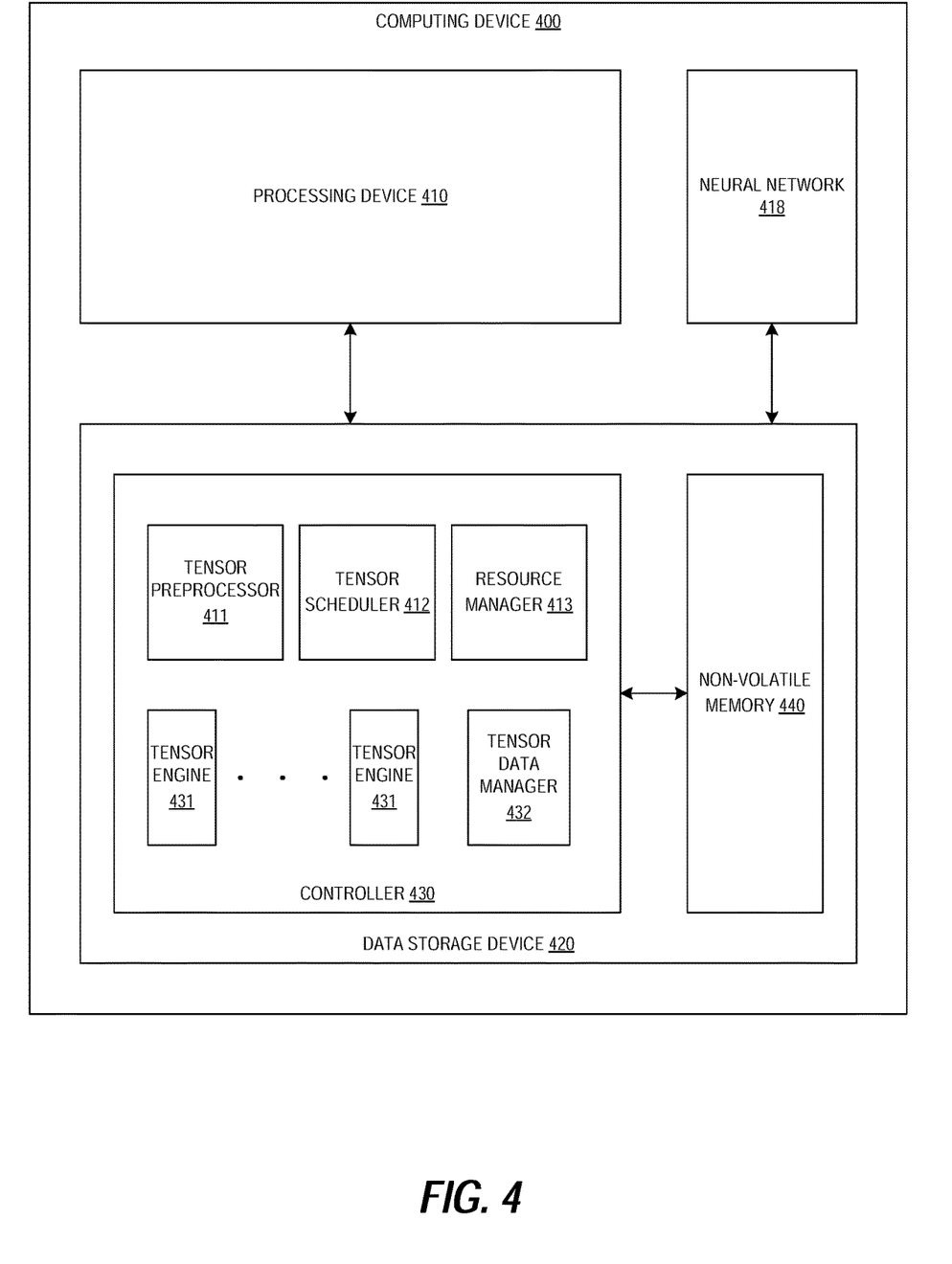
FIG. 4 is a block diagram illustrating an example computing device, in accordance with one or more embodiments of the present disclosure.

FIG. 4 is a block diagram illustrating an example computing device 400, in accordance with one or more embodiments of the present disclosure. The computing device 400 includes a processing device 410, a neural network 418, and a data storage device 420. The computing device 400 may be a device that may execute services, processes, applications, apps, instructions, etc., to perform one or more operations. The data storage device 420 includes a controller 430 coupled to a non-volatile memory 440. The controller 430 may manage aces to the non-volatile memory and perform error correction. For example, the controller 430 may execute access commands to read, write, and/or access pages, blocks, etc., of the non-volatile memory 440.

The controller 430 includes a tensor preprocessor 411, a tensor scheduler 412, and a resource manager 413, tensor engines 431, and a tensor data manager 432. Although the tensor engines 431 are illustrated as part of the controller 430, the tensor engines 431 may be separate from the controller 430 in other embodiments. Although the data storage device 420 is illustrated as part of or inside the computing device 400, in other embodiments, the data storage device 420 may be separate from the computing device 400. The tensor engines 431 may be hardware (e.g., specialized vector engines), software, firmware, or a combination thereof.

As discussed above, the neural network 418 may include nodes, connections between the nodes, and weights or weight values associated with the connections. The weights may be represented as tensors (e.g., multi-dimensional tensors, multi-dimensional vectors, etc.). In one embodiment, a tensor may be multi-dimensional array of real numbers. The real numbers may be represented using a fixed-point representation (e.g., a 16-bit fixed point representation, a 32-bit fixed point representation, etc.). Operations on the tensors may make up the majority of the computational operations that are performed by the neural network 418. The operations on the tensors may be referred to as tensor operations. Because tensor operations may make up the majority of the computational operations that are performed by the neural network 418, the controller 430 includes tensor engines 431, which may be specialized vector engines that can be used to perform tensor operations on tensors that are stored in the non-volatile memory 440.

One type of tensor operation may be a tensor dot operation, which may also be referred to as a tensor contraction operation. The tensor dot operation may operate on two tensors A and B along specified axes of the two tensors A and B. The axes for tensor A may be referred to as A_axes and the axes for tensor B may referred to as B_axes. The tensor dot operation may sum the product of elements from the two tensors A and B over the indices specified by A_axes and B_axes. The A_axes and B_axes specify pairs of axes along which to contract the tensors A and B. The axis A_axes[i] of tensor A should have the same dimension as axis B_axes[i] of tensor B. The A_axes and B_axes should also have identical length and consist of unique integers that specify valid axes for each of the tensors A and B. The tensor dot operation may generate, calculate, determine, return, etc., a tensor C which may be the sum of the product of elements from the two tensors A and B over the indices specified by A_axes and B_axes. Various other types of tensor operations may be performed by the tensor engines 431 in other embodiments. For example, tensor addition operations, tensor subtraction operations, tensor product operations, tensor convolution operations, tensor index operations (e.g., operations that raise or lower a tensor index by multiplying a tensor with covariant tensors or contravariant tensors).

As discussed above, tensor operations may be offloaded (e.g., transferred) to the tensor engines 431 to allow the tensor operations to be performed more quickly and/or efficiently. Offloading the tensor operations to the tensor engines 431 (rather than using the processing device 410 to perform the tensor operations) may allow the processing device to perform other operations or tasks while the tensor engines 431 perform the tensor operations (e.g., may free up the processing device 410 and allow the processing device 410 to operate in parallel with the tensor engines 431). Although the tensor preprocessor 411, the tensor scheduler 412, and the resource manager 413 are illustrated as part of the controller 430, one or more of the above-referenced components may be included as part of the processing device 410. For example, the resource manager 413 may be included as part of the processing device 410. The tensor preprocessor 411, the tensor scheduler 412, and the resource manager 413 may facilitate the offloading of the tensor operations to the tensor engines 431.

In one embodiment, the tensor preprocessor 411 may manage an input queue. The input queue may include tensor operations that are requested by the neural network 418. The tensor preprocessor 411 may convert input data into a tensor graph format and provide converted input data to the tensor engines 431. The input queue may be used by the tensor scheduler 412 to schedule the tensor operations, as discussed in more detail below.

In one embodiment, the tensor scheduler 412 may schedule the tensor operations that may be performed by the tensor engines 431. For example, the tensor scheduler 412 may analyze the input queue and may determine which tensor engines 431 will perform which tensor operations from the input queue. The tensor scheduler 412 may also coordinate tensor operations between tensor engines 431. For example, a first resulting tensor from a first tensor operation performed by a first tensor engine may be provided to a second tensor engine 431 so that the second tensor engine 431 may perform a second tensor operation using the first resulting tensor. The tensor scheduler 412 may manage a pipeline of tensor operations that may different stages that are distributed among the different tensor engines 431. The tensor scheduler 412 may also communicate with the tensor data manager 432 to retrieve the weights for the different connections of the neural network 418.

In one embodiment, the tensor scheduler 412 may interact with the resource manager 413 to determine whether there are sufficient resources to operate the tensor engines 431. For example, the data storage device 420 may include ten tensor engines 431 and each tensor engine 431 uses 100 mA of power. If the computing device 400 is able to provide 500 mA of power (in addition the power already used by the computing device 400), the tensor scheduler 412 may allow five of the tensor engines 431 to operate and may schedule tensor operations on those give tensor engines 431.

In one embodiment, the resource manager 413 may determine the amount of available resources (e.g., power) and/or thermal constraints for the computing device 400 and/or the data storage device 420. For example, the resource manager 413 may determine thermal constraints or limits from a configuration file or based on user input. The resource manager 413 may also determine how much power is available from a power source of the computing device 400 (e.g., from a battery). The resource manager 413 many monitor the amount of power used by the computing device 400, the data storage device 420, and/or by the tensor engines 431. The resource manager may communicate data indicating the amount of resources (e.g., amount of power) that is available and the current temperatures of different components (e.g., the temperatures of the tensor engines 431) to the tensor scheduler 412.

The tensor engines 431 may be hardware accelerated engines that may be used to implement pipelined tensor stages to perform convolution, activation, and pooling stages for the neural network 419. The number of stages and the number of tensor engines 431 used in each stage may be based on the parameters of the neural network 418 and may be based on the tensor workload (e.g., the amount of tensor operations that are to be performed). Tensor engines 431 may obtain the weights (which may be represented using tensors) for different connections from the tensor data manager 432.

In one embodiment, the tensor data manager 432 may obtain the weights for different connections from the non-volatile memory 140. The tensor data manager 432 may also determine what data should be passed between different tensor pipeline stages (e.g., between different tensor engines 431). For example, one tensor engine 431 may use the resulting tensor generated by another tensor engine 431. The tensor data manager 432 may forward the resulting tensor to the other tensor engine 431 by storing the resulting tensor in a random access memory for faster access.

In one embodiment, the tensor data manager 432 may also manage data partition between SLC memory and MLC memory when the data storage device includes flash memory (e.g., flash chips, memory cells, etc.). The tensor data manager 432 may help extend flash memory endurance and may perform wear leveling operations. For example, the tensor data manager 432 may store weights for each convolution of the neural network 418 (e.g., a CNN) in MLC memory because the weights may be read more often than they are written to. However, intermediate data between layers of the neural network 418 may be stored in SLC memory because the intermediate data may be written to more often. The tensor data manager 432 may also store the intermediate data and the weights on different flash memory planes or dies to reduce the access latency and help optimize wear leveling. The above described SLC/MLC approach is an example only, and other embodiments can be generalized to apply to any type of memories with varying high endurance/low endurance.

Figure 5:
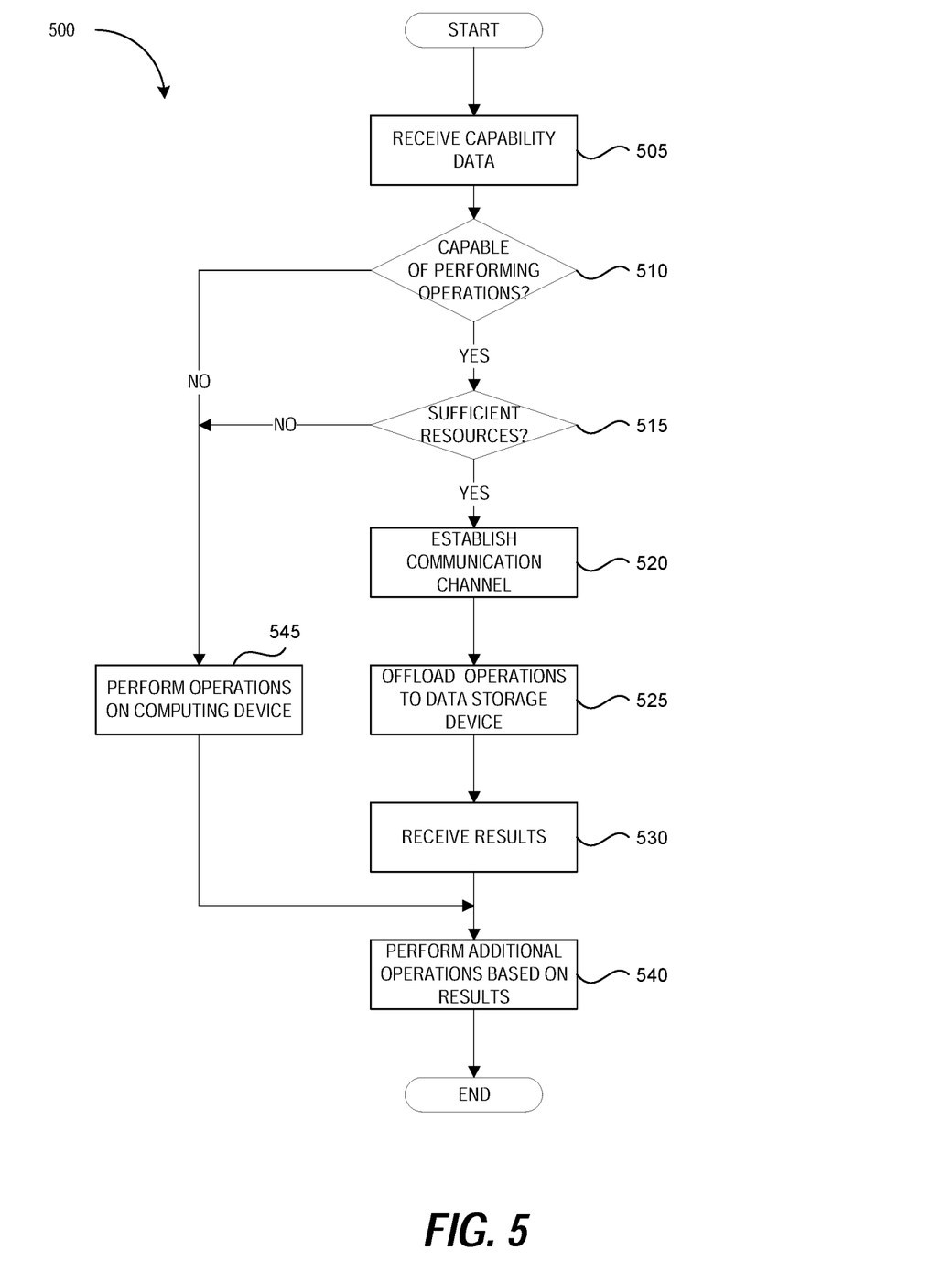
FIG. 5 is a flowchart illustrating an example a process for offloading computational operations to a data storage device, in accordance with one or more embodiments of the present disclosure.

FIG. 5 is a flowchart illustrating an example a process for offloading computational operations to a data storage device, in accordance with one or more embodiments of the present disclosure. The method 500 may be performed by a processing device (e.g., a processor, a central processing unit (CPU), a controller, an application-specific integrated circuit (ASIC), a field programmable gate array (FPGA), etc.), a neural network, a computation engine, etc. For example, the method 500 may be performed by a processing device of a computing device. The controller, processing device, neural network, and/or computation engine may be processing logic that includes hardware (e.g., circuitry, dedicated logic, programmable logic, microcode, etc.), software (e.g., instructions run on a processor to perform hardware simulation), firmware, or a combination thereof.

The method 500 begins at block 505 where the method 500 receives capability data from a data storage device, as discussed above. The capability data may be received in response to a request for the capability data or may be transmitted automatically go a data storage device. At block 510, the method 500 determines whether the data storage device is capable of performing one or more computational operations based on the capability data, as discussed above. If the data storage device is not capable of performing the one or more computational operations, the method 500 may perform the one or more computational operations using a processing device of the computing device. If the data storage device is capable of performing the one or more computational operations, the method 500 determines whether there are sufficient resources to perform the one or more computational operations at block 515. If there are not enough resources to perform the one or more computational operations, the method 500 may perform the one or more computational operations using a processing device of the computing device.

If there are sufficient resources to perform the one or more computational operations, the method 500 establishes a communication channel between the computing device and the data storage device at block 520. At block 525, the method 500 offloads the one or more computational operations to the data storage device (e.g., to one or more computation engines of the data storage device). For example, the method 500 may transmit one or more parameters for the computational operations to the data storage device. At block 530, the method 500 may receive one or more results of the computational operations, as discussed above. For example, the method 500 may receive resulting data and/or storage locations. The method 500 may optionally perform additional computational operations based on the results received from the data storage device at block 540.

Figure 6:
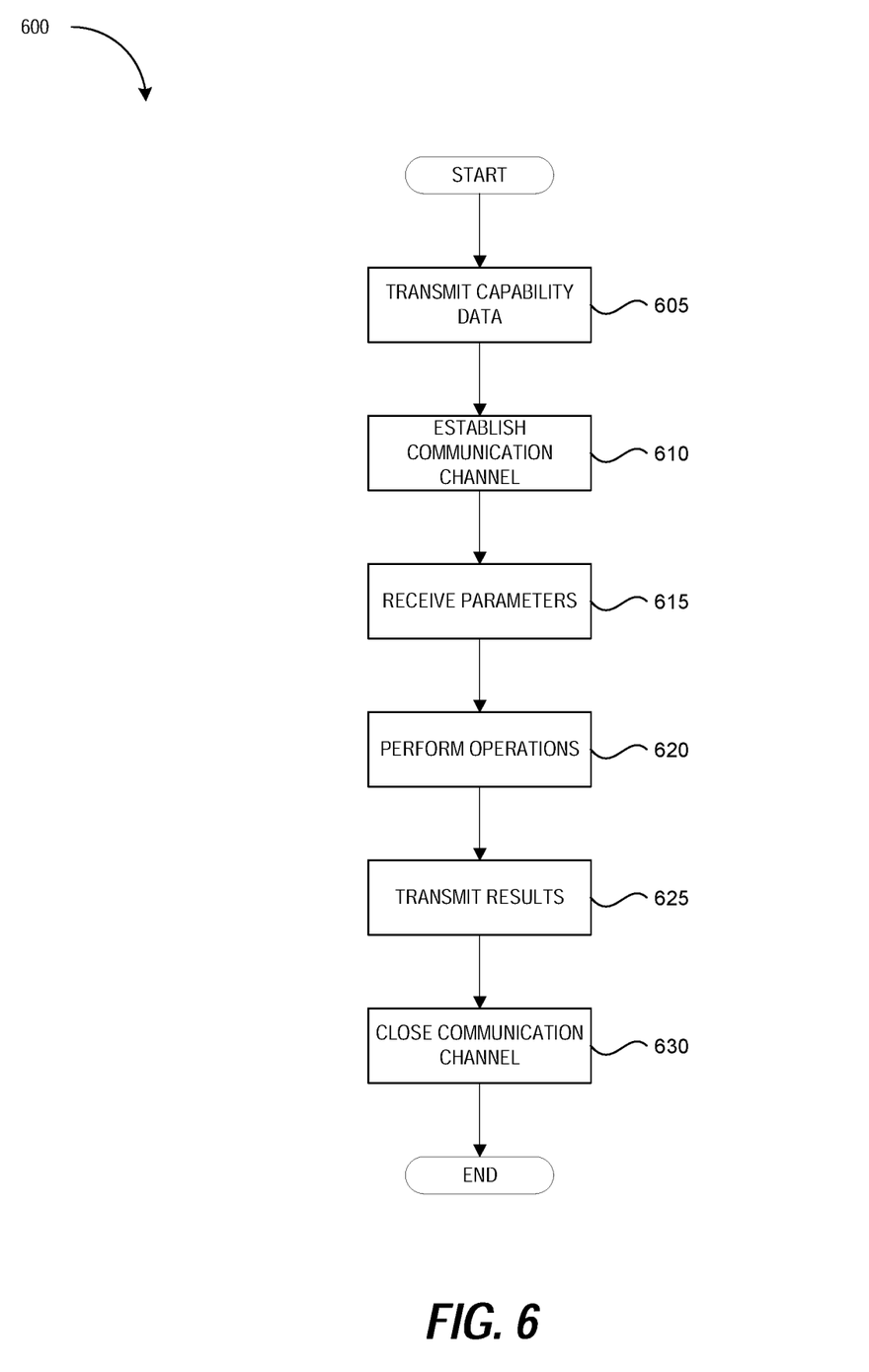
FIG. 6 is a flowchart illustrating an example a process for offloading computational operations to a data storage device, in accordance with one or more embodiments of the present disclosure.

FIG. 6 is a flowchart illustrating an example a process for offloading computational operations to a data storage device, in accordance with one or more embodiments of the present disclosure. The method 600 may be performed by a processing device (e.g., a processor, a central processing unit (CPU), a controller, an application-specific integrated circuit (ASIC), a field programmable gate array (FPGA), etc.), a neural network, a computation engine, etc. For example, the method 600 may be performed by a controller and/or a computation engine of a data storage device. The controller, processing device, neural network, and/or computation engine may be processing logic that includes hardware (e.g., circuitry, dedicated logic, programmable logic, microcode, etc.), software (e.g., instructions run on a processor to perform hardware simulation), firmware, or a combination thereof.

The method 600 begins at block 605 where the method 600 transmits capability data to a computing device. The method 600 may transmit the capability data automatically or in response to a request from the computing device. At block 610, the method 600 establishes a communication channel with the computing device. The method 600 may receive parameters for one or more computational operations at block 615, as discussed above. At block 620, the method 600 may perform the one or more computational operations. For example, the method 600 may perform the one or more computation operations using computation engines on the data storage device. At block 625, the method 600 may transmit one or more results of the computational operations to the computing device. The method 600 may optionally close the communication channel at block 630.

Although the present disclosure may refer to CNNs, RNNs, etc., other types of neural networks and/or machine learning methods, functions, techniques, operations, data structures, etc., may be used in other embodiments. For example, a probabilistic neural network may be used in other embodiments. In addition, although the present disclosure may refer to tensor operations and/or tensors, other types of computational operations (e.g., DCTs, FFTs, etc.) and/or other types of data (e.g., matrices, vectors, tables, lists, hashes, hash tables, etc.) may be used in other embodiments.

Some embodiments of the present disclosure may be used to advantage in error correction code schemes in data storage devices and/or computing devices. For example, some embodiments of the present disclosure may allow for computational operations to be offloaded to computation engines on data storage device. This may allow computational operations to be performed more quickly and efficiently. This may also allow the computational operations to be performed without using network bandwidth to offload the computational operations to another computing device. This may further allow the capabilities and/or functionalities of a computing device to be increased without modifying or upgrading components of the computing device.

General Comments

Those skilled in the art will appreciate that in some embodiments, other types of distributed data storage systems may be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage device, comprising:
   non-volatile memory; and
   a controller configured to:
      receive from a computing device by the data storage device:
         a request to perform a set of computational operations; and
         a set of parameters indicated for the set of computational operations, wherein the data storage device is hot swappable, and wherein the controller is further configured to implement a logical interface;
      determine that the computing device has sufficient available resources; for the data storage device to perform the set of computational operations, wherein the sufficient available resources comprise available power;
      access at least a portion of the resources from the computing device in response to determining that the computing device has the sufficient available resources in order to perform the set of computational operations;
      perform the set of computational operations in conjunction with the set of parameters, wherein:
         the set of computational operations is offloaded to the data storage device by the computing device; and
         the set of computational operations comprises one or more tensor operations, wherein the set of parameters comprise one or more tensor parameters indicated to be performed by the tensor operations, the one or more tensor parameters comprising one or more of: a computational library, a data format, an additional computational operation, a data location, a data size, and a result location; and
      transmit a set of results of the set of computational operations to the computing device; and
      wherein data is stored on the non-volatile memory.

2. The data storage device of claim 1, wherein:
   the sufficient available resources comprise available thermal constraint;
   access the portion of the sufficient available resources further comprises:
      providing at least one or more of a portion of the available power and a portion of the available thermal constraint from the computing device to the data storage device in response to determining that the computing device has the sufficient available resources in order to perform the set of computational operations; and
   the controller is further configured to:
      receive, from the computing device, a query requesting capability data, wherein the capability data indicates a set of types of operations that the data storage device is capable of performing; and
      transmit the capability data to the computing device.

3. The data storage device of claim 1, wherein the controller is further configured to:
   establish a communication channel between the data storage device and the computing device.

4. The data storage device of claim 1, wherein the data storage device comprises one or more computation engines configured to:
   perform the set of computational operations in conjunction with the set of parameters; and
   perform the tensor operations in conjunction with the tensor parameters, wherein the tensor parameters of the set of parameters comprise at least one or more of: (i) names of operations indicated to be performed, (ii) first locations of data indicated for performing the operations, (iii) second locations of available data indicated for storing the set of results of the operations, and (iv) data sizes indicated for performing the operations.

5. The data storage device of claim 3, wherein the set of results indicates a set of locations in the non-volatile memory of the data storage device where the set of results are stored.

6. The data storage device of claim 1, wherein:
   the data storage device lacks an internal power source; and
   the data storage device receives power to operate the data storage device from the computing device.

7. A method, comprising:
   determining that a data storage device coupled to a computing device is capable of performing a set of computational operations, wherein the data storage device is hot swappable;
   determining that the computing device has sufficient available resources for the data storage device to perform the set of computational operations, the sufficient available resources comprise available power;
   accessing at least a portion of the resources from the computing device to the data storage device in response to determining that the computing device has the sufficient available resources in order to perform the set of computational operations;
   offloading the set of computational operations to the data storage device in response to determining that the data storage device is capable of performing the set of computational operations, wherein a set of parameters are indicated for the set of computational operations, and wherein the set of computational operations are performed in conjunction with the set of parameters, wherein:
the set of computational operations comprise one or more tensor operations; and
the set of parameters comprise one or more tensor parameters indicated to be performed by the tensor operations, the one or more tensor parameters comprising one or more of: a computational library, a data format, an additional computational operation, a data location, a data size, and a result location; and
executing a neural network using a controller of the data storage device in order to analyze data captured by the computing device based on the offloading.

8. The method of claim 7, wherein:
the data storage device comprises one or more computation engines configured to:
perform the set of computational operations in conjunction with the set of parameters; and
perform the tensor operations in conjunction with the tensor parameters, wherein the tensor parameters of the set of parameters comprise at least one or more of: (i) names of operations indicated to be performed, (ii) first locations of data indicated for performing the operations, (iii) second locations of available data indicated for storing the set of results of the operations, and (iv) data sizes indicated for performing the operations; and
the sufficient available resources comprise available thermal constraint;
accessing the portion of the sufficient available resources further comprises:
providing at least one or more of a portion of the available power and a portion of the available thermal constraint from the computing device to the data storage device in response to determining that the computing device has the sufficient available resources in order to perform the set of computational operations.

9. The method of claim 7, wherein offloading the set of computational operations comprises:
establishing a communication channel between the computing device and the data storage device;
transmitting, by the computing device, first data indicating the set of parameters for the set of computational operations to the data storage device via the communication channel; and
receiving, by the computing device, a set of results of the set of computational operations from the data storage device via the communication channel.

10. The method of claim 9, further comprising:
performing, by the computing device, one or more additional computational operations based on the set of results.

11. The method of claim 9, wherein the set of results indicates a set of locations in a non-volatile memory of the data storage device where the set of results are stored.

12. The method of claim 7, further comprising:
detecting that the data storage device has been coupled to the computing device;
requesting capability data from the data storage device, wherein the capability data indicates a set of types of operations that the data storage device is capable of performing; and
receiving the capability data from the data storage device.

13. The method of claim 12, wherein determining that the data storage device is capable of performing the set of computational operations comprises:
determining that the set of computational operations is indicated in the capability data.

14. The method of claim 7, wherein determining that the computing device has sufficient resources comprises:
determining that the computing device is capable of providing power to the data storage device to perform the set of computational operations.

15. The method of claim 7, wherein determining that the computing device has sufficient resources comprises:
determining that the computing device or the data storage device is capable satisfying one or more thermal constraints.

16. The method of claim 7, wherein the data storage device comprises a memory card.

17. The method of claim 7, wherein:
the data storage device lacks an internal power source; and
the data storage device receives power to operate the data storage device from the computing device.

18. An apparatus, comprising:
a processing device configured to:
determine whether a data storage device coupled to a computing device is capable of performing a set of computational operations, wherein the data storage device is hot swappable;
determine that the computing device has sufficient available resources for the data storage device to perform the set of computational resources, the sufficient available resources comprise available power;
provide at least a portion of the resources from the computing device to the data storage device in response to determining that the computing device has the sufficient available resources in order to perform the set of computational operations;
offload the set of computational operations to the data storage device in response to determining that the data storage device is capable of performing the set of computational operations, wherein a set of parameters are indicated for the set of computational operations, and wherein the set of computational operations are performed in conjunction with the set of parameters, wherein:
the set of computational operations comprise one or more tensor operations, and
the set of parameters comprise one or more tensor parameters indicated to be performed by the tensor operations, the one or more tensor parameters comprising one or more of: a computational library, a data format, an additional computational operation, a data location, a data size, and a result location;
perform the set of computational operations on the computing device in response to determining the data storage device is not capable of performing the set of computational operations; and
store one or more results of the computational operations to the data storage device.

* * * * *